(12) United States Patent
Vegh et al.

(10) Patent No.: US 11,023,502 B2
(45) Date of Patent: Jun. 1, 2021

(54) USER INTERACTION EVENT DATA CAPTURING SYSTEM FOR USE WITH AERIAL SPHERICAL IMAGERY

(71) Applicant: AERIAL SPHERE, LLC, Phoenix, AZ (US)

(72) Inventors: Dennis J. Vegh, Phoenix, AZ (US);
John C. Femiani, Gilbert, AZ (US);
Michael Katic, Gilbert, AZ (US);
Anshuman Razdan, Phoenix, AZ (US)

(73) Assignee: Aerial Sphere, LLC, Phoenix, AZ (US)

( * ) Notice: Subject to any disclaimer, the term of this patent is extended or adjusted under 35 U.S.C. 154(b) by 0 days.

(21) Appl. No.: 16/793,601

(22) Filed: Feb. 18, 2020

(65) Prior Publication Data

US 2020/0183958 A1 Jun. 11, 2020

Related U.S. Application Data

(63) Continuation of application No. 16/182,052, filed on Nov. 6, 2018, now abandoned, which is a continuation of application No. 15/059,051, filed on Mar. 2, 2016, now Pat. No. 10,120,878.

(60) Provisional application No. 62/126,913, filed on Mar. 2, 2015.

(51) Int. Cl.
*G06F 15/173* (2006.01)
*G06F 16/29* (2019.01)

(52) U.S. Cl.
CPC .................................. *G06F 16/29* (2019.01)

(58) Field of Classification Search
CPC ..... G06F 15/29; H04L 41/0893; H04L 67/02; H04L 67/10
See application file for complete search history.

(56) References Cited

U.S. PATENT DOCUMENTS

| 2007/0003108 A1* | 1/2007 | Chinomi ................ G03B 37/06 382/104 |
| 2007/0150177 A1* | 6/2007 | Smith ..................... G06F 30/18 701/533 |
| 2007/0174079 A1 | 7/2007 | Kraus |
| 2008/0066000 A1* | 3/2008 | Ofek ...................... G06F 16/29 715/757 |

(Continued)

FOREIGN PATENT DOCUMENTS

KR 20010000345 A * 1/2001

*Primary Examiner* — Thanh T Nguyen
(74) *Attorney, Agent, or Firm* — Schmeiser, Olsen & Watts LLP

(57) ABSTRACT

A data capturing system for use with aerial spherical imagery is provided. The system allows for capturing and tracking of data with respect to those accessing and viewing particular aerial spherical imagery, such as the imagery on a GIS map. The data capturing system may include a server having a processor and a memory and a software application providing instruction to the server to display aerial spherical imagery, such as spherical imagery, to a user through a network connection, such as through the Internet. For example the system may provide the map as a web site to the user that is displayed on a remote computing device accessible by the user in order to view the spherical imagery. Data related to the interaction of the user with the website is captured and tracked in order to use such data for other purposes.

4 Claims, 1 Drawing Sheet

(56) References Cited

U.S. PATENT DOCUMENTS

| | | | |
|---|---|---|---|
| 2009/0180356 A1* | 7/2009 | Fujisawa | G01S 19/34 368/47 |
| 2009/0327071 A1* | 12/2009 | Kreft | G06F 16/2379 705/14.49 |
| 2010/0045704 A1* | 2/2010 | Kim | G01C 21/3626 345/660 |
| 2010/0057343 A1* | 3/2010 | Chan | G01C 21/20 701/533 |
| 2011/0084870 A1* | 4/2011 | Kondo | B63B 49/00 342/41 |
| 2011/0238751 A1* | 9/2011 | Belimpasakis | G06F 3/011 709/204 |
| 2015/0245168 A1* | 8/2015 | Martin | G06Q 50/01 715/751 |
| 2017/0036771 A1* | 2/2017 | Woodman | B64D 27/26 |
| 2017/0174079 A1* | 6/2017 | May | B60K 17/34 |
| 2017/0193008 A1* | 7/2017 | Kreft | G06F 16/29 |

* cited by examiner

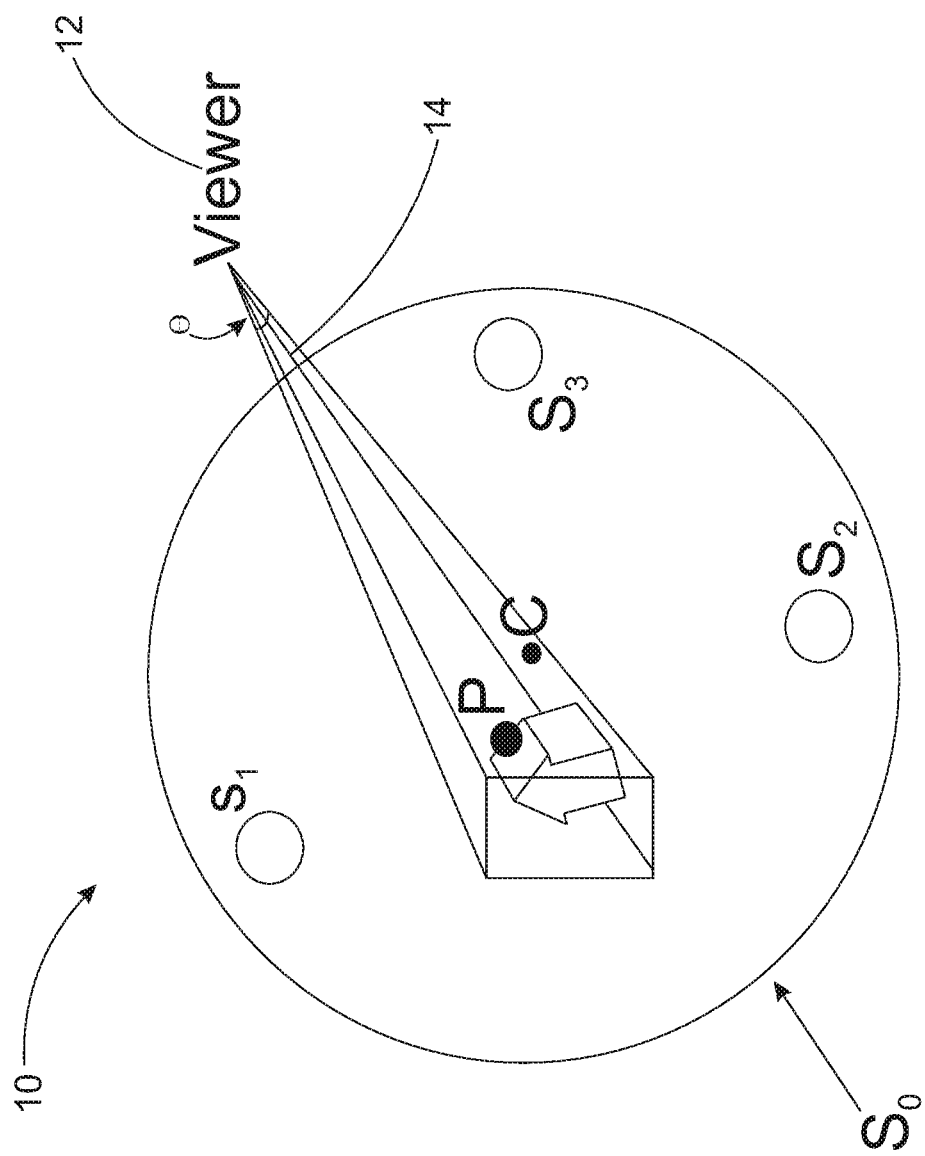

USER INTERACTION EVENT DATA CAPTURING SYSTEM FOR USE WITH AERIAL SPHERICAL IMAGERY

CROSS REFERENCE TO RELATED APPLICATION[S]

This application is a continuation of U.S. patent application entitled "USER INTERACTION EVENT DATA CAPTURING SYSTEM FOR USE WITH AERIAL SPHERICAL IMAGERY," Ser. No. 15/059,051, filed Mar. 2, 2016, which claims priority to U.S. Provisional Patent Application entitled "USER INTERACTION EVENT DATA CAPTURING SYSTEM FOR USE WITH AERIAL SPHERICAL IMAGERY," Ser. No. 62/126,913, filed Mar. 2, 2015, the disclosure of which is hereby incorporated entirely herein by reference.

BACKGROUND OF THE INVENTION

Technical Field

This invention relates generally to a data capturing system and more particularly to a data capturing system for use with aerial spherical imagery.

State of the Art

Aerial photography is useful for many different purposes. For example, aerial photography is used for cartography, land-use planning, archaeology, movie production, environmental studies, surveillance, commercial advertising, conveyancing, artistic projects, and many other purposes. The imagery that is captured is often used with a geographic information system ("GIS") to provide additional information.

Various business and entities are utilizing aerial spherical imagery in order to market and provide better service to customers and the like by using GIS maps and the like. However, a system of capturing data of those accessing such aerial spherical imagery and tracking the data for specific purposes does not exist.

Accordingly, there is a need for a data capturing system for use with aerial spherical imagery.

SUMMARY OF THE INVENTION

The present invention relates to a data capturing system for use with aerial spherical imagery. The system allows for capturing and tracking of data with respect to those accessing and viewing particular aerial spherical imagery, such as the imagery on a GIS map.

An embodiment of a data capturing system for use with aerial spherical imagery includes a server having a processor and a memory and a software application providing instruction to the server to display aerial spherical imagery, such as spherical imagery, to a user through a network connection, such as through the Internet. The system includes a remote computing device accessible by the user in order to view the spherical imagery. The server further includes instructions to capture any geographic data, time data, zoom level and the like associated with a user accessing the spherical imagery through the network connection. The data is captured and stored in memory on the server in a database that is searchable and may be manipulated by other software applications to utilize such collected data.

An embodiment includes a user interaction event data capturing system for use with aerial spherical imagery, the system comprising: a server comprising a memory, a database stored in the memory, and a processor, wherein the database contains data for a spherical image and data for a reference map; and a computer coupled to the server wherein a user interfaces with the server through the computer, wherein the server is programmed to: automatically display at the computer a georectified spherical image sent from the server; automatically receive at the server data of the user interaction with the spherical image communicated from the computer, wherein the data of the user includes a georectified point of interest; automatically store the data of the user in the database of the server.

The server may be further programmed to automatically receive at the server data of the user interaction with the spherical image communicated from the computer, wherein the data of the user includes dwell time at the georectified point of interest; automatically receive at the server data of the user interaction with the spherical image communicated from the computer, wherein the data of the user includes a plurality of georectified points of interest; automatically receive at the server data of the user interaction with the spherical image communicated from the computer, wherein the data of the user includes a dwell time at each of the plurality of georectified points of interest; to automatically receive at the server data of the user interaction with the spherical image communicated from the computer, wherein the data of the user includes an order of viewing each of the plurality of georectified points of interest; to automatically receive at the server data of the user interaction with the spherical image communicated from the computer, wherein the data of the user includes at least one zoom level of viewing the georectified point of interest; to automatically receive at the server data of the user interaction with the spherical image communicated from the computer, wherein the data of the user includes data regarding jumping to at least one neighboring spherical image.

Another embodiment includes a method of using a post capture imagery processing system to georectify an aerial spherical image, the method comprising: storing data for a spherical image and data for a reference map in a database of a server comprising a memory and a processor, wherein the database is stored in the memory; coupling the server to a computer, wherein a user interfaces with the server through the computer; automatically displaying at the computer a georectified spherical image sent from the server; automatically receiving at the server data of the user interaction with the spherical image communicated from the computer, wherein the data of the user includes a georectified point of interest; and automatically storing the data of the user in the database of the server.

The method may further comprise automatically receiving at the server data of the user interaction with the spherical image communicated from the computer, wherein the data of the user includes dwell time at the georectified point of interest; automatically receiving at the server data of the user interaction with the spherical image communicated from the computer, wherein the data of the user includes a plurality of georectified points of interest; automatically receiving at the server data of the user interaction with the spherical image communicated from the computer, wherein the data of the user includes a dwell time at each of the plurality of georectified points of interest; automatically receiving at the server data of the user interaction with the spherical image communicated from the computer, wherein the data of the user includes an order of viewing each of the plurality of georectified points of interest; automatically receiving at the server data of the user interaction with the spherical image communicated from the computer, wherein the data of the user includes at least one zoom level of viewing the georectified point of interest; and automatically receiving at the server data of the user interaction with the spherical image communicated from the computer, wherein the data of the user includes data regarding jumping to at least one neighboring spherical image.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 1 is a diagrammatic view of a system for capturing user interaction event data, in accordance with an embodiment of the invention.

DETAILED DESCRIPTION OF EMBODIMENTS OF THE INVENTION

As discussed above, embodiments of the present invention relate to a data capturing system for use with aerial spherical imagery. The system allows for capturing and tracking of data with respect to those accessing and viewing particular aerial spherical imagery, such as the imagery on a GIS map.

The data capturing system may include a server having a processor and a memory and a software application providing instruction to the server to display aerial spherical imagery, such as spherical imagery, to a user through a network connection, such as through the Internet. For example the system may provide the map as a website to the user that is displayed on a remote computing device accessible by the user in order to view the spherical imagery.

Access of the spherical imagery on a remote computing device establishes a communication link between the remote computing device and the server. The software application operating on the server to display the spherical imagery further includes instructions to capture any geographic data, time data, zoom level and the like associated with a user accessing the spherical imagery through the network connection. The data is captured and stored in memory on the server in a database that is searchable and may be manipulated by other software applications to utilize such collected data.

For example, the data collected may include what is being looked at, geo-references associated with the displayed image, the zoom level, the time it was accessed and additional movement and interactions with the system, including any search terms, resulting image displayed in response to entering the search terms.

This image allows for the determining of any area of interest and can be utilized in other applications. For example, if the user is accessing such a system as part of searching for a home to buy, the data captured may be utilized by the system to provide advertisement or additional house listings to the person accessing the system. Or, a user can access the system in search of where a particular restaurant or retail store is located. The system may collect data and direct specific advertising to the user based on the collected geographical data and the other data collected from the spherical imagery. Such data may also be utilized in military applications.

In essence, embodiments of the present invention allow a system to collect data from a user of the system, wherein the data include having points selected by the user and paths viewed by the user georectified. Further the present invention allows the capturing the path, order and dwell time for a starting sphere and moving to neighboring spheres including the dwell time in the neighboring spheres.

Referring to FIG. 1, depicted is a diagrammatic view of the system 10 that allows for capture of user interaction events and data. When the user is looking at a region within the spherical image or current sphere 50 having a center C in a deployment interface, including viewer 12, the system 10 captures data related to the viewing frustum defined by the pyramid 14 or field of view, by taking average foveal focus capacity of human beings to narrow down the focus area within this pyramid 14, the zoom level or angle θ, and if the user clicks the point of interest P. We can geo rectify using our reverse warp process to then accurately project the perceived point/area of interest. We can also take points along the path travelled by the user/viewer and create a navigational history that is georectified. The capture of the path data may include a simple formula of path data=Path+ td, wherein td is the dwell time or time the user spends at a location. This calculation describes various places the user looked and in what order, and if the user jumped to neighboring spheres, such as, but not limited to neighboring spheres S1, S2, S3 and so forth. Further jumps to other spheres and total path travelled being captured has not been previously tracked. Particularly when that information is georectified in order to accurately determine what particular places, buildings, stores and the like the user was looking at, dwelling on and the like.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A user interaction event data capturing system for use with aerial spherical imagery, the system comprising:
   a server comprising a memory, a database stored in the memory, and a processor, wherein the database contains data for a spherical image and data for a reference map; and
   a computer coupled to the server wherein a user interfaces with the server through the computer, wherein the server is programmed to:
   automatically display at the computer a georectified spherical image sent from the server;
   automatically receive at the server data of the user interaction with the spherical image communicated from the computer, wherein the data of the user includes a plurality of georectified points of interest;
   automatically store and track the data of the user in the database of the server; and analyze the plurality of georectified points of interest along a path travelled by the user and create a navigational history that is georectified.

2. The system of claim 1, wherein the server is further programmed to automatically receive at the server data of the user interaction with the spherical image communicated from the computer, wherein the data of the user includes dwell time at the plurality of georectified points of interest.

3. The system of claim 2, wherein the server is further programmed to automatically receive at the server data of the user interaction with the spherical image communicated from the computer, wherein the data of the user includes a dwell time at each of the plurality of georectified points of interest.

4. The system of claim 3, wherein the server is further programmed to automatically receive at the server data of the user interaction with the spherical image communicated from the computer, wherein the data of the user includes an order of viewing each of the plurality of georectified points of interest.

* * * * *